United States Patent
Kelly, III et al.

(10) Patent No.: US 6,272,477 B1
(45) Date of Patent: Aug. 7, 2001

(54) HYPERTRAPEZOIDAL FUZZY DYNAMIC STATE INTERPRETER

(75) Inventors: Wallace E. Kelly, III, Apex, NC (US); John H. Painter, College Station, TX (US)

(73) Assignee: The Texas A&M Univerisity System, College Station, TX (US)

( * ) Notice: Subject to any disclaimer, the term of this patent is extended or adjusted under 35 U.S.C. 154(b) by 0 days.

(21) Appl. No.: 09/148,523

(22) Filed: Sep. 4, 1998

Related U.S. Application Data

(60) Provisional application No. 60/058,110, filed on Sep. 5, 1997.

(51) Int. Cl.$^7$ .............................. G06F 15/18; G06G 7/00
(52) U.S. Cl. ................................................ 706/5; 706/902
(58) Field of Search ........................................ 706/5, 902

(56) References Cited

U.S. PATENT DOCUMENTS

| | | | |
|---|---|---|---|
| 5,036,730 | * 8/1991 | Sakai et al. | 701/57 |
| 5,179,625 | * 1/1993 | Hisano | 706/1 |
| 5,491,775 | * 2/1996 | Madau et al. | 706/4 |
| 5,832,187 | * 11/1998 | Pedersen et al. | 706/45 |
| 5,953,228 | * 9/1999 | Kurtzberg et al. | 700/97 |
| 5,983,161 | * 11/1999 | Lemelson et al. | 701/301 |

OTHER PUBLICATIONS

Kelly, III et al, "Soft Computing in the General Aviation Cockpit" Proceedings of the 1st On–Line Workshop of Soft Computing, Aug. 1996.*

Baranyi et al, "A General Interpolation Technique in Fuzzy Rule Bases with Arbitrary Membership Functions", IEEE International Conference on Systems, Man and Cybernetics, Oct. 1996.*

Foster et al, "Optimal Set Placement and Multi Dimensional Fuzzy Sets for Fuzzy Controllers", IEE International Conference on Control, 1994.*

Wallace E. Kelly, III, "Dimensionality in Fuzzy Systems", A Dissertation, Aug. 1997, pp. 1–106.

John H. Painter, et al., "Decision Support for the Gneeral Aviation Pilot", Proceedings of the 1997 IEEE International Conference on Systems, Man, and Cybernetics, Orlando, FL, Oct. 12–15, 1997, pp. 1–6.

Wallace E. Kelly, III, et al., "Hypertrapezoidal Fuzzy Membership Functions for Decision Aiding", WSC2: 2nd On–Line World Conference on Soft Computing, Jun. 23–27, 1997, pp. 1–9.

Wallace E. Kelly, III, et al., "Hypertrapezoidal Fuzzy Membership Functions," Fifth IEEE International Conference on Fuzzy Systems, Sep. 8, 1996, pp. 1–6.

* cited by examiner

Primary Examiner—George B. Davis
(74) Attorney, Agent, or Firm—Baker Botts L.L.P.

(57) ABSTRACT

An apparatus for determining the state of a dynamic system is disclosed. The apparatus comprises one or more sensors operable to sample physical parameters of a system, and a mode interpreter. The mode interpreter is operable to receive data from the sensor and determine the state of the dynamic system using hypertrapezoidal membership functions.

23 Claims, 5 Drawing Sheets

HYPERTRAPEZOIDAL FUZZY DYNAMIC STATE INTERPRETER

RELATED APPLICATIONS

This application claims the benefit of U.S. Provisional Application No. 60/058,110 filed Sep. 5, 1997.

TECHNICAL FIELD OF THE INVENTION

This invention relates generally to the field of computer modeling and more specifically to a hyper trapezoidal fuzzy dynamic state interpreter.

BACKGROUND OF THE INVENTION

The modeling of dynamic systems is an important step in the development of computer based interpretation of dynamic systems. Attempts have been made to model such diverse systems as financial markets, chemical plant operations and aircraft operations. However, typical statistical and numerical interpretation methods have failed because the parameters used to model systems often lead to faulty interpretation of the state that the system is in. This is because there are not always precise boundaries between system parameters and system states.

To help alleviate this problem, the concept of fuzzy sets was developed. The purpose of fuzzy sets is to deal with classes that have no sharply defined criteria of class membership. This helps to deal with the uncertainty that exists in complex dynamic systems.

Fuzzy systems are useful to help encode human knowledge into dynamic systems by allowing for the presence of uncertainty. Fuzzy systems consist of three parts, a fuzzifier, a rule and a defuzzifier. Inputs in the form of numerical data measured in the dynamic system are inputted into the fuzzifier. The fuzzifier prepares the exact numerical data for analysis in the rule base. The numerical data is mapped into fuzzy sets within a certain degree of certainty.

The fuzzy rule base encodes expert knowledge into sets of if/then rules. The number of rules depends on the complexity of the system, which is based on the number of inputs and the number of sets defined on each input domain. The defuzzifier converts the fuzzy output of the fuzzy rule base into exact numerical values if needed.

The drawback to this approach is that as the number of inputs increase, the size of the rule base grows exponentially. Thus, current fuzzy systems are inappropriate for complex dynamic systems. What is needed is an efficient way to apply fuzzy systems to interpret complex dynamic systems.

SUMMARY OF THE INVENTION

Accordingly, it may be appreciated that a need has arisen for a hyper trapezoidal fuzzy dynamic state interpreter in accordance with the teaching of present invention.

In one embodiment, an apparatus for determining the state of a dynamic system is disclosed. The apparatus comprises one or more sensors operable to sample physical parameters of a system, and a mode interpreter. The mode interpreter is operable to receive data from the sensor and determine the state of the dynamic system using hypertrapezoidal membership functions.

In another embodiment, a method for determining the state of a dynamic system is disclosed. In a first step a family of hypertrapezoidal membership functions are formulated which relate system parameters to system modes. Data from sensors monitoring the dynamic system's operation is received in a second step. In a third step, the state of the system is determined by applying the hypertrapezoidal membership functions to received data.

The present invention provides various technical advantages over current methods for interpreting dynamic systems. For example, one technical advantage is that complex dynamic system can be evaluated in an efficient manner without an extremely large rule base Other technical advantages may be readily apparent to one skilled in the art from the following figures, descriptions, and claims.

BRIEF DESCRIPTION OF THE DRAWINGS

For a more complete understanding of the present invention and the advantages thereof, reference is now made to the following description taken in conjunction with the accompanying drawings, in which like reference numbers represent like parts, wherein.

DETAILED DESCRIPTION OF THE DRAWINGS

The present invention and its advantages are best understood by referring to FIGS. 1–9 of the drawings, like numerals being used for like and corresponding parts of the drawings. The following invention is described using an aircraft as the exemplary dynamic system to be interpreted and analyzed. Of course, the use of an aircraft is only an example and any other complex dynamic system can also be modeled and interpreted using the teaching of the present invention.

Hypertrapezoidal Fuzzy Membership Functions

Currently, fuzzy logic systems use fuzzy membership functions that are defined in a single domain, i.e., functions of one variable. This works for systems of low complexity. However, as the complexity of a system increases the number of one-dimensional membership functions needed to model the system increase exponentially. This is due to a phenomenon known as correlation. Correlation means that a dynamic system's state is represented by irregular but smoothly connected regions in a multi-variable state space.

This means there is a continuous but irregular transition from one state to another in a dynamic system. One dimensional membership functions cannot by themselves represent such a relationship. One solution to this problem is to form a composition of two or more single variable regions. However, this increases the number of fuzzy sets needed and therefore increases the size of a rule base needed to evaluate the fuzzy sets.

A better approach is to assume that all the membership functions of a system sum to one over the state space. That is, the membership functions, $\mu_i(x)$, satisfies the equation:

$$\sum_i \mu_i(x) = 1; \forall x \quad (1)$$

Membership functions defined in this manner are referred to as fuzzy partitioning of the state space.

Fuzzy membership functions based on Gausian probability density functions can easily be extended to N-dimensions. While Gausian membership functions have proved useful in some areas, such as clustering and training, these membership functions do not exhibit the property of Equation 1. However, trapezoidal membership functions can easily be defined within the design constraints of Equation 1.

Figure 1:
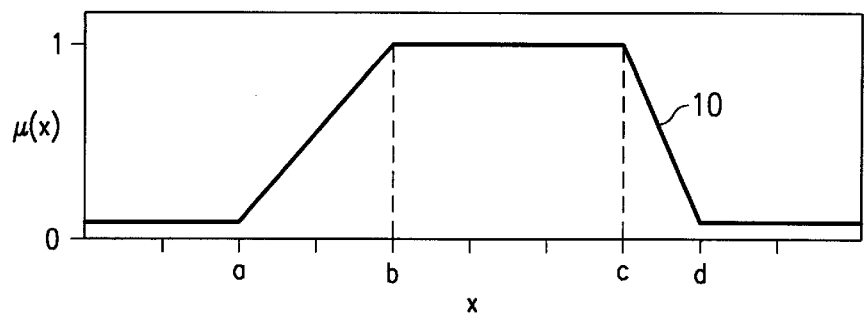
FIG. 1 illustrates the standard method for defining one-dimensional trapezoidal membership functions.

FIG. 1 illustrates the standard method for defining one-dimensional trapezoidal membership functions 10. Along the y-axis is the membership function value. Along the x-axis is a x axis value. A, B, C, and D are the four points that define trapezoid membership function 10. This method is shown as an illustration only, for it is hard to take this method and define it in terms of multiple dimensions. For example, extending a trapezoidal membership function into a two-dimensional space requires at least eight points to be plotted. Instead what is needed is a definition of a trapezoidal membership function for N-dimensional space, or a hypertrapezoidal membership function. Hypertrapezoidal membership functions are defined by prototype points of fuzzy sets and a crispness factor.

Based on the requirement of equation 1, hypertrapezoidal fuzzy membership functions can be calculated. In a fuzzy partitioning of N-dimensional space, for each fuzzy set, $S_i$, there is defined a prototype point $\lambda_i$. A prototype point is an N-dimensional vector associated with a particular value for that fuzzy set. The prototype point $\lambda_i$, for a fuzzy set $S_i$, with a membership function, $\lambda_i(x)$, satisfies the equations:

$\mu_i(\lambda_i)=1$ $\mu_j(\lambda_j)=0_{j \neq i}$ (2)

Furthermore, the partition of the space is parameterized by a crispness factor, $\sigma$. The crispness factor is a value between 1 and 0 that determines how much ambiguity exists between the sets of the partitioning. If $\sigma$ equals 1 then no fuzziness exists between the sets. If $\sigma$ is less than 1, then there is some overlap between sets. The crispness factor is defined by the equation as shown below:

$$\sigma = \frac{2a}{d} \quad (3)$$

The crispness factor establishes how much of the space between each prototype point is fuzzy. The parameter d is the Euclidean difference between the two prototype points. The parameter a is the amount sets overlap.

Figure 2:
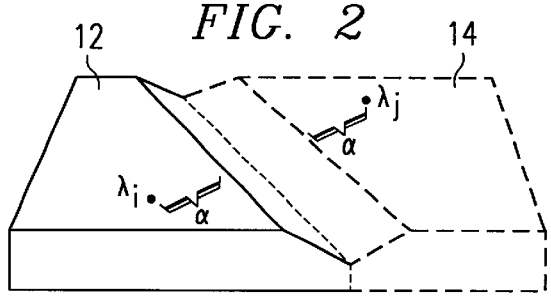
FIG. 2 illustrates the parameters of a hypertrapezoidal membership function model in accordance with the teaching of the present invention.

FIG. 2 illustrates the parameters of a hypertrapezoidal membership function model in accordance with the teaching of the present invention. Illustrated is a first set or state region 12 and a second set or state region 14. A first prototype point, $\lambda_1$ is a representative value for first set 12, while a second prototype point, $\lambda_2$ is a representative value for second set 14. The parameter $\alpha$ indicates a point of overlap of the sets.

The second step in deriving hypertrapezoidal membership functions is to calculating the distance ratio from an input value to two prototype points. Given a fuzzy set $S_i$ and $S_j$ with prototype points $\lambda_i$ and $\lambda_j$, and an input $\Lambda$ the distance ratio is:

$$\rho_{i|j}(\Lambda) = \frac{|\vec{v}_i|^2 - |\vec{v}_j|^2}{|\vec{v}_{ij}|^2}, \quad (4)$$

where $\vec{v}_i$ is a vector from $\lambda_i$ to $\Lambda$, $\vec{v}_j$ is a vector from $\lambda_j$ to $\Lambda$, and $\vec{v}_{ij}$ is a vector from $\lambda_i$ to $\lambda_j$.

The above equation can be derived by considering the case where the input lies in one region at a boundary and using the Pythagorean Theorem to isolate all the vector terms. The result is a measure of normalized, relative distance between the input $\Lambda$ and the two prototype points. This distance measure is used to determine if the input $\Lambda$ lies completely within one of the fuzzy sets or in a region between two fuzzy sets.

The next step in deriving hypertrapezoidal membership functions is determining the degree of membership that the input has in set $S_i$ given that set $S_j$ is the only other set in the partition. If fuzzy sets $S_i$ and $S_j$ are the only two sets defined in the n-dimensional space then the following equation will determine the degree of membership:

$$\mu_{i|j}(\Lambda) = \begin{cases} 0; & \rho_{i|j}(\Lambda) \geq 1 - \sigma \\ 1; & \rho_{i|j}(\Lambda) \leq \sigma - 1 \\ \dfrac{\vec{v}_{ij} \cdot \vec{v}_j - \dfrac{\sigma}{2}|\vec{v}_{ij}|^2}{(1-\sigma)|\vec{v}_{ij}|^2}; & \text{otherwise} \end{cases} \quad (5)$$

In the first case of Equation 5, the input lies fully in the fuzzy set $S_j$. In the second case, the input lies fully in fuzzy set $S_i$. The third case calculates how much of the input lies in set $S_i$ as opposed to set $S_j$.

The final step in deriving hypertrapezoidal fuzzy membership functions is to generalize from two sets to an arbitrarily large number of sets. Therefore, the final step in derivation requires combining the membership functions of Equation 5 for all sets that are not the same as the initial set. In this case, the degree of membership of a point at each of the M fuzzy sets can be calculated in one of two ways. The first is based on product sum inference and is shown as Equation 6. The second is based on minimum/maximum inferences and is shown as Equation 7. Both of these equations are normalized such that Equation 1 is satisfied, i.e., that the complete set of hypertrapezoidal membership functions sum to zero:

$$\mu_i(\Lambda) = \frac{\prod_{j=1 \neq i}^{M} \mu_{i|j}(\Lambda)}{\sum_{k=1}^{M} \left( \prod_{j=1 \neq k}^{M} \mu_{k|j}(\Lambda) \right)} \text{ for } i = 1, 2, \ldots M \quad (6)$$

$$\mu_i(\Lambda) = \frac{\min_j(\mu_{i|j}(\Lambda))}{\sum_{k=1}^{M}\left(\min_j(\mu_{i|j}(\Lambda))\right)} \text{ for } i = 1, 2, \ldots M \quad (7)$$

Thus, the design of hypertrapezoidal membership functions requires two steps. First, prototype points need to be selected. Second, a crispness factor needs to be selected. These values can be determined experimentally. The computation of hypertrapezoidal membership functions requires three sets of calculations. A distance measure of equations must be calculated, the conditional membership function is determined, and the composition to dimensions is done using either Equation 6 or 7. As can be seen from Equation 6 and 7 an M-dimensional membership function can be determined using only M+1 parameters. This reduces the number of parameters needed that must be calculated over using a series of one-dimensional equations.

Application of Hypertrapezoidal Fuzzy Membership Functions to Dynamic Systems

Figures 3, 5:
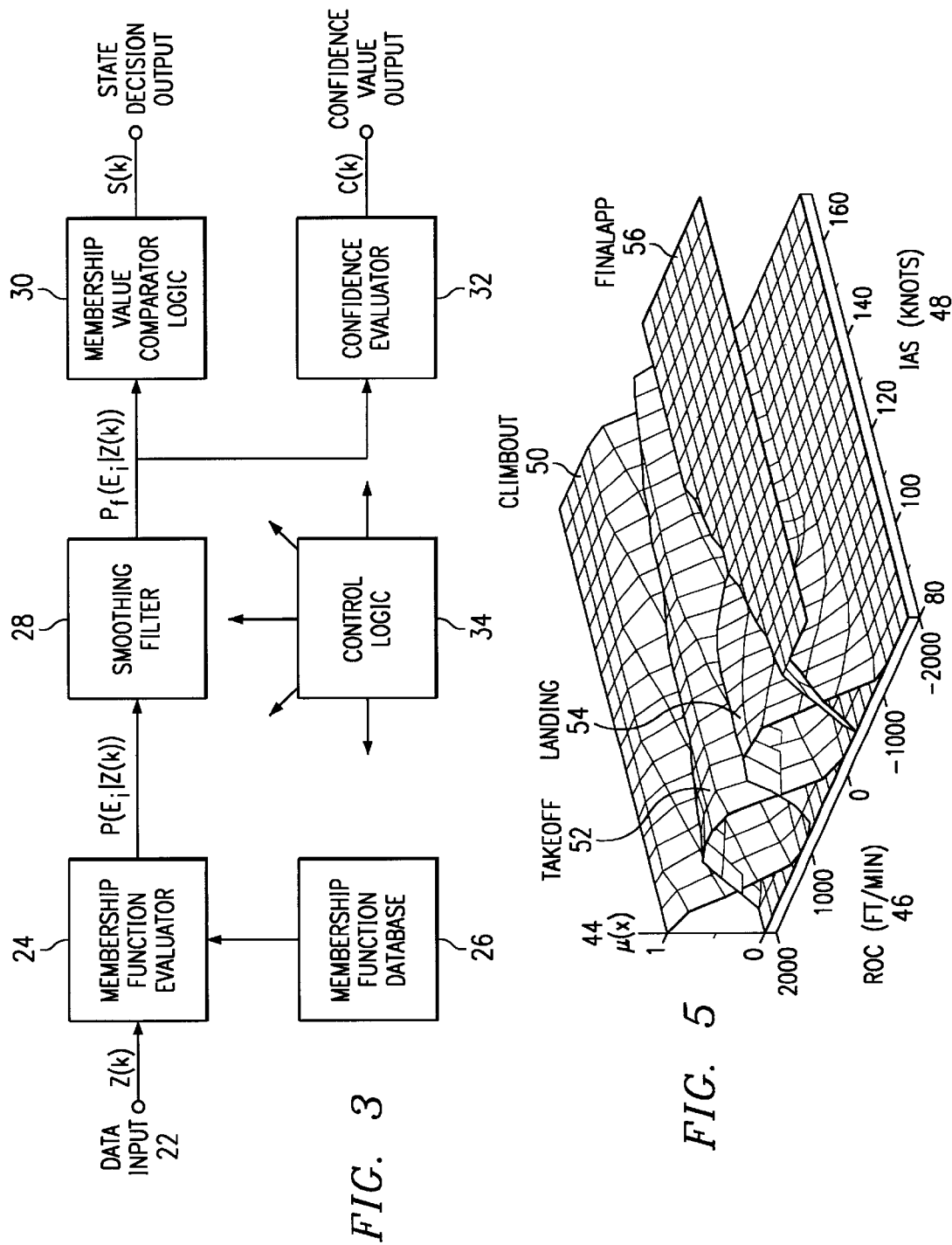
FIG. 3 illustrates a block diagram that shows the state interpretation of a dynamic system according to the teachings of the present invention.
FIG. 5 illustrates a graph of two variables of an aircraft and associated membership function.

FIG. 3 illustrates a block diagram that shows the state interpretation of a dynamic system according to the teachings of the present invention. Data members 22, Z(k), are received from the dynamic system. Data members 22 are measurements of variables that characterize the operation of the dynamic system. In the example of an aircraft, these variables may include air speed, altitude, and distances from known locations, engine power level, and other variables. Typically, data members 22 are sampled by use of a sensor, or similar means, with the samples taken at uniform intervals, such as every T seconds. The ideal sampling time depends upon the dynamic system to be interpreted. In the example of an aircraft, sampling time is typically of the order of 0.2 seconds.

Data members 22 are routed to a membership function evaluator 24. Membership function evaluator 24 uses a membership function database 26. Membership function database 26 provides hypertrapezoidal membership functions that are denoted as $P(E_i|\bullet)$. This notation is read, "P of $E_i$ given $\bullet$(dot)." The membership function notation used in the first section, $\mu_i(x)$, is equivalent to the probability representation, $P(E_i|\bullet)$, used in this section. The functions are evaluated using the data Z(k) as the argument inserted in the position given by the dot. $E_i$ denotes the ith possible system operating mode, under the view that the system state can be taken as a probabilistic event. The subscript, i, denotes an integer number characterizing the different states possible for the dynamic system. In the aircraft application, the preferred embodiment uses the letter i to represent the various dynamic states the system can be in. These states can include TAXI, TAKEOFF, CLIMBOUT, CRUISE, INITAPP (initial approach), FINALAPP (final approach), and LANDING. In the aircraft application, the states of the dynamic system is also known as the flight mode.

Figure 4:
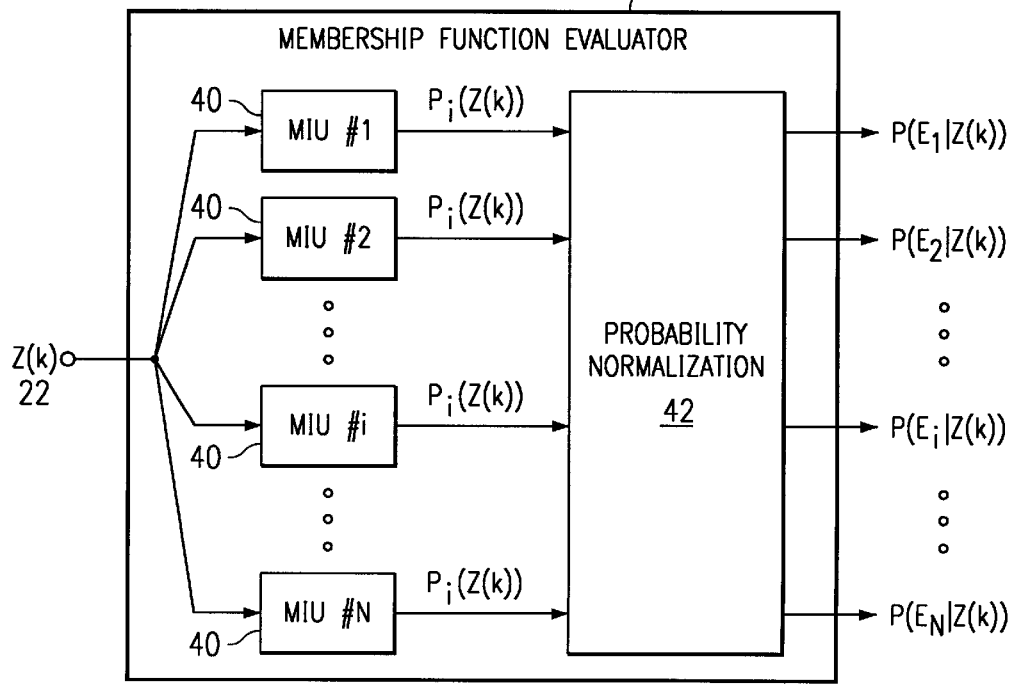
FIG. 4 illustrates the operation of the membership function evaluator in accordance with the teaching of the present invention.

FIG. 4 illustrates the operation of membership function evaluator 24 in accordance with the teaching of the present invention. Data 22 is inputted into membership function evaluator 24 where it is distributed to N parallel membership inference units 40, where N is the number of possible operation states. Membership inference units 40 calculate an unnormalized version of the probability of being in that state. The calculations are done using hypertrapezoidal membership functions stored in membership function database 26. All of the results from membership inference unit are normalized at probability normalizer 42 such that all the probabilities sum to one. The output is the set $P(E_i|Z(k))$ for i=1 to N and is known as raw uncertainty values. This result is then sent on to the rest of the system illustrated in FIG. 3 and detailed below. Referring back to FIG. 3, hypertrapezoidal membership functions are stored in membership function database 26 using the hypertrapezoidal fuzzy membership representation as discussed in the previous section. These are multiple dimensional mathematical functions whose dimensionality is equal to that of the irregular measurement data. For example, in the preferred embodiment of the aircraft application, the measured data includes such variables as air speed, altitude, rate of climb, and tour ratios of distances of known points. Thus, the measured data is an array having seven elements and the membership functions are shaped in seven dimensional Euclidean space. While it is difficult to visualize seven dimensional space, hypertrapezoidal membership functions can be represented as dependent upon two variables on a three dimensional graph.

FIG. 5 illustrates a graph of two variables of an aircraft and associated membership function. A first axis 44 is the membership function axis, a second axis 46 of the graph represents the rate of climb and is listed in feet per minute. A third axis 48 is the indicated air speed of the aircraft and is represented in knots. A given combination of rate of climb and indicated air speed will appear in one part of the given graph. The different places on the given graph represent the different states the aircraft can be in such as climb out 50, take off 52, landing 54 and final approach (FINALAPP) 56. Therefore, certain combinations of rate of climb and indicated air speed lead to the hypertrapezoidal membership function being evaluated as certain states or modes of the aircraft. However there is some overlap between states as will be discussed below.

Returning to FIG. 3, after membership function evaluator 24 evaluates the data input, it outputs what is known as the raw certainty values. These values are then sent to a smoothing filter 28 which removes slight variations in values caused by minor perturbations in the measured data variables. The output of the smoothing filter is sent to membership value comparator logic 30 and a confidence evaluator 32.

Membership value comparator logic 30 ranks the number of filtered certainty values as outputted by smoothing filter 28 and outputs an identity of the dynamic state the system is in. The state chosen is the state with the highest filtered certainty value. This identified dynamic system state is denoted, S(k), and can be outputted as an ASCII text to a presentation means, such as a video display screen, in the natural language of. the user's choice. Membership value comparator logic 30 is operable to output an identified dynamic system state for each and every data sample that is inputted into system 20.

Also, for each particular sample value, the filtered certainty values for every dynamic system state are sent to confidence evaluator 32. This evaluator uses stored values to compute a measure of confidence in the state decision. That level of confidence is then outputted as a number C(k). The confidence value is computed using the following equation:

$$C(k) = 1 - \frac{P_{f-small}(E_i|Z(k))}{P_{f-large}(E_i|Z(k))} \quad (8)$$

Where $P_{f-small}(E_i|Z(k))$ is the second largest of the filtered uncertainty values and $P_{f-large}(E_i|Z(k))$ is the largest of the filtered uncertainty values. This value may be thought of as a percent confidence at a given time. The computed confidence is outputted for each and every data sample as a real number between 1 and 0. If the confidence is low, i.e. close to zero, then the chosen mode may not be reported as indicated above. Whether to report an indicated mode change may depend on the computed confidence value as analyzed by another subsystem, such as a control logic 34.

Figure 6:
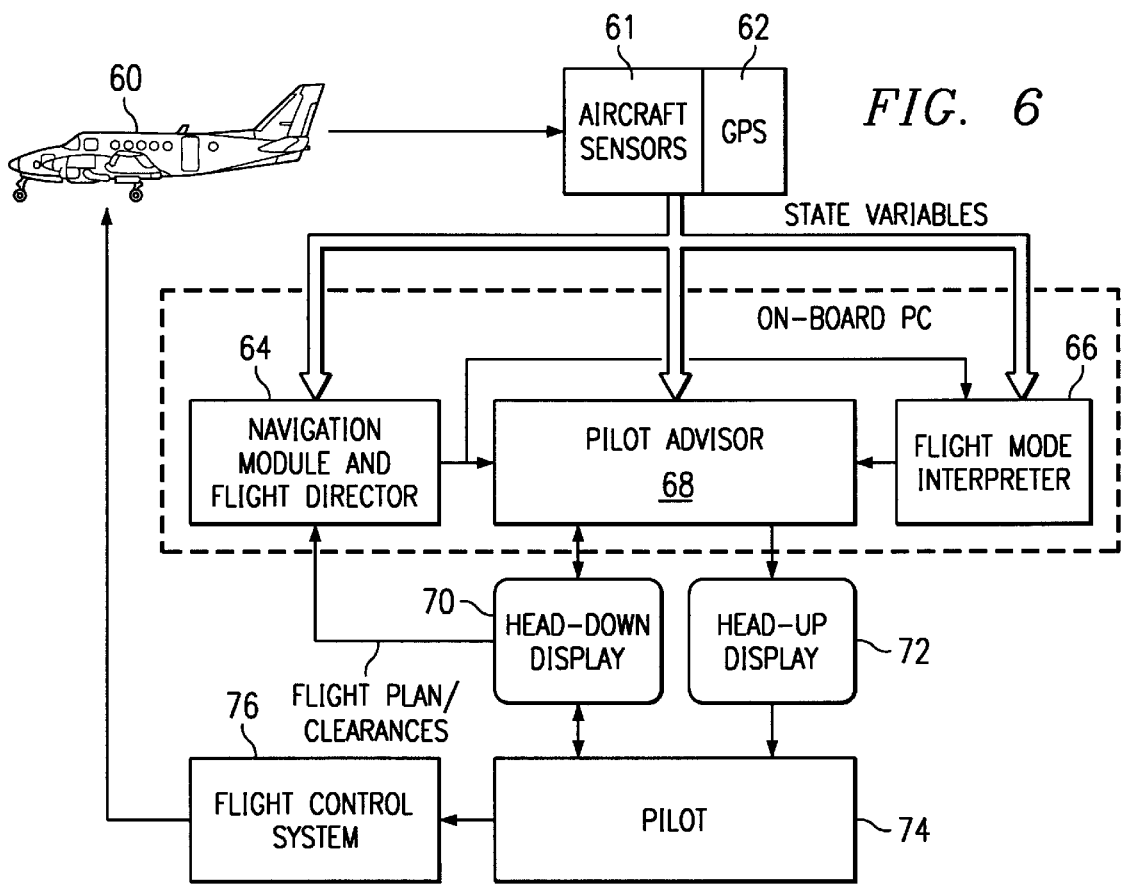
FIG. 6 illustrates a block diagram of a flight mode interpreter system for an aircraft in accordance with a teaching of the present invention.

FIG. 6 illustrates a block diagram of a flight mode interpreter system for an aircraft in accordance with the teaching of the present invention. Aircraft 60 comprises aircraft sensors 61 and one or more global positioning sensors 62. Aircraft sensors 61 are operable to measures such parameters as speed of the aircraft, rate of climb of the aircraft and engine power. Global positioning sensor 62 is operable to determine the location of the aircraft using a system of satellites in orbit around the earth and the global positioning sensor decoders located on the aircraft. The global positioning sensor 62 can determine the location of the aircraft as well as distances to points along a route or any point of interest.

These sensor values are sent to two units. One unit is a navigation module and flight director 64 the other is a flight mode interpreter. Navigation module and flight director 64 is operable to compute quantities based on the sensor inputs and send them to flight mode interpreter 66 and a pilot advisor 68. Flight mode interpreter 66 is an aircraft version of system 20 as illustrated in FIG. 2.

Flight mode interpreter 66 takes the data provided by aircraft sensors 61, global positioning sensor 62, and navigation module and flight director 64, and, using hypertrapezoidal membership functions, computes the state that the aircraft is in. The state information is sent to a pilot advisor 68, which displays on the head down display 70 or heads up display 72, or similar presentation means, advice based on the flight mode the aircraft is currently in. A pilot 74 can see this information when using flight control system 76 and control aircraft 60. Optionally, pilot advisor 68 can change the mode of the presentation means based on the current flight mode. For example, as an aircraft shifts from cruise to final approach, the heads up display 72 might automatically switch from what it was displaying to an instrument landing system (ILS) indicator mode to display landing information. In one embodiment, mode information might be used to automatically change physical settings of a dynamic system or automatically control a system's function.

Pilot advisor 68 is an expert system, with expertise in aircraft limitations, navigation, flight procedures, and the like. Pilot advisor 68 relies on flight mode interpreter 66 to indicate the current operational mode, or state, of the aircraft. Based on the current flight mode, pilot advisor 68 uses a set rules that check the physical limitations of the aircraft and displays information relevant to the current mode on either the heads up display 72 and head down display 70. The goal of pilot advisor 68 is to reduce the workload of the pilot during operations.

Figure 7:
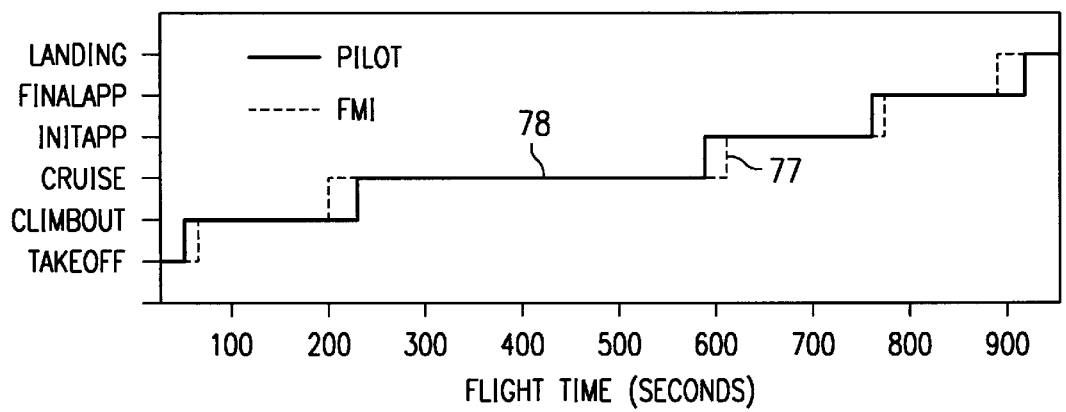
FIG. 7 illustrates a pilot and flight mode interpreter interpretation of what flight mode an aircraft is in at various stages of flight time.

FIG. 7 illustrates a pilot and flight mode interpreter 66 interpretation of what flight mode an aircraft is in at various stages of flight time. The flight modes are taxi, take-off, climb out, cruise, initial approach (INITAPP), final approach (FINALAPP), and landing. The dotted line represents a pilot's final determination of the current flight mode and the solid line represents the interpreted flight mode determined by the flight mode interpreter. As can be seen, at certain times flight mode interpreter lags behind the pilot in determining what state the aircraft is in such as between takeoff to climb out or other times the flight mode interpreter is ahead of the pilot advisor for example, in climb out to cruise. The system is designed to give the most accurate determination flight mode as possible as to be useful for a pilot in a part of pilot assistance system.

Figure 8A:
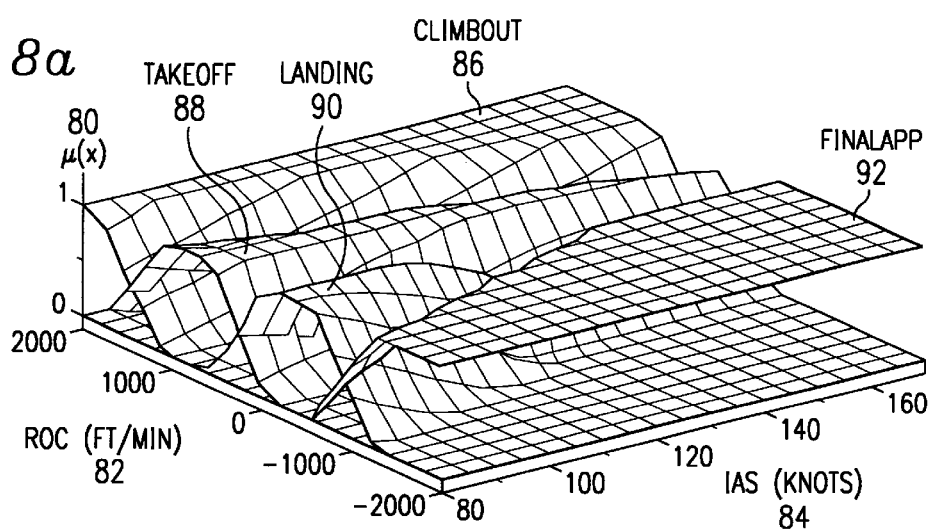
FIGS. 8a, 8b, 8c, and 8d illustrate hypertrapezoidal membership functions for an exemplary flight mode interpreter at different altitudes; and, FIG. 9 is a flow chart illustrating the operation of a flight mode interpreter in accordance with the teachings of the resent invention.

FIGS. 8a, 8b, 8c, and 8d illustrate hypertrapezoidal membership functions for an exemplary flight mode interpreter at different altitudes. In FIG. 8a, the aircraft is at 500 feet. A first axis 80 represents the hypertrapezoidal membership function. A second axis 82 represents the rate of climb in feet per minute. The third axis 84 represents the indicated air speed in knots. At 500 feet above the ground, the different possible modes the aircraft can be in are climb out (CLIMBOUT) 86, take off (TAKEOFF) 88, landing 90 and final approach (FINALAPP) 92. The actual mode that the aircraft is in depends upon the combination of values between the rate of climb and the indicated air speed in knots. For example, it can be seen from FIG. 8a a negative rate of climb when a large indicated air speed is indicative of the mode known as a final approach. A higher climb rate and a high indicated air speed are indicative of the mode of climb out 86.

Figure 8B:
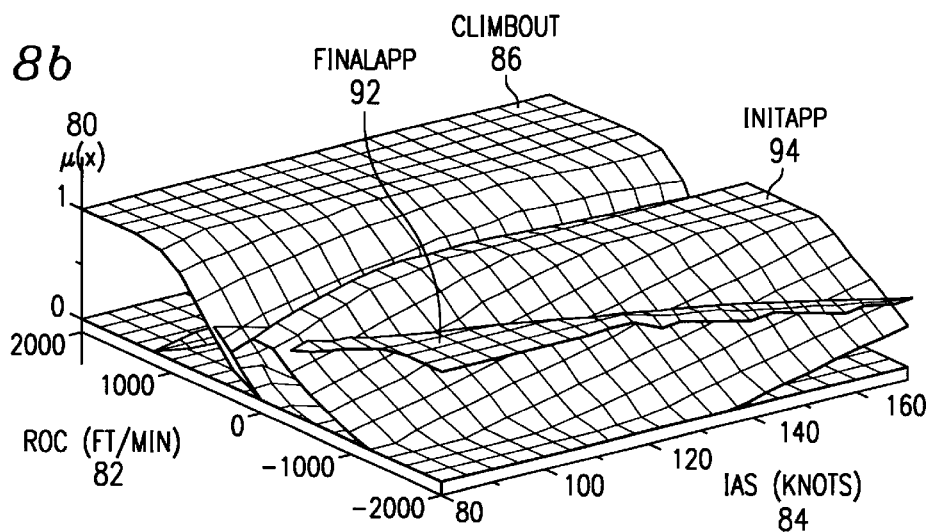

FIG. 8b illustrates the hypertrapezoidal membership function for an altitude of 1,500 feet above the ground. The axis values are the same as before. At 1,500 feet above the ground, possible modes the aircraft can be in are climb out 86, initial approach 94 and final approach 92. For example, if the rate of climb is very high value, such as 1,500 feet per minute, and the indicator air speed is 120 knots, the aircraft is in a climb out 86.

Figure 8C:
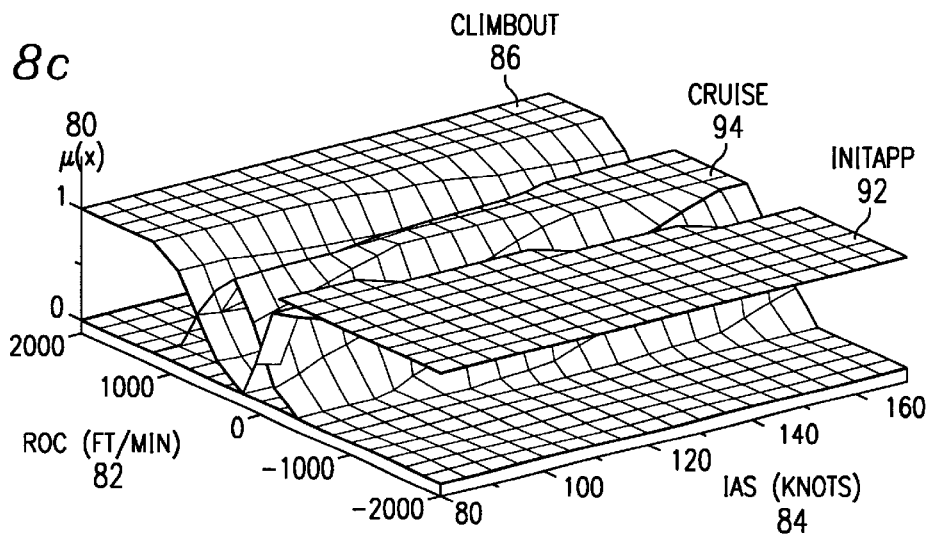

FIG. 8c illustrates the same parameters for altitudes of 3,000 feet above ground. As can be seen in this illustration, as altitude increases the mode for cruise 96 appears. Thus, an aircraft at 3,000 feet with a climb rate around zero feet per second and an indicated air speed of 160 is in cruise mode 96.

Figure 8D:
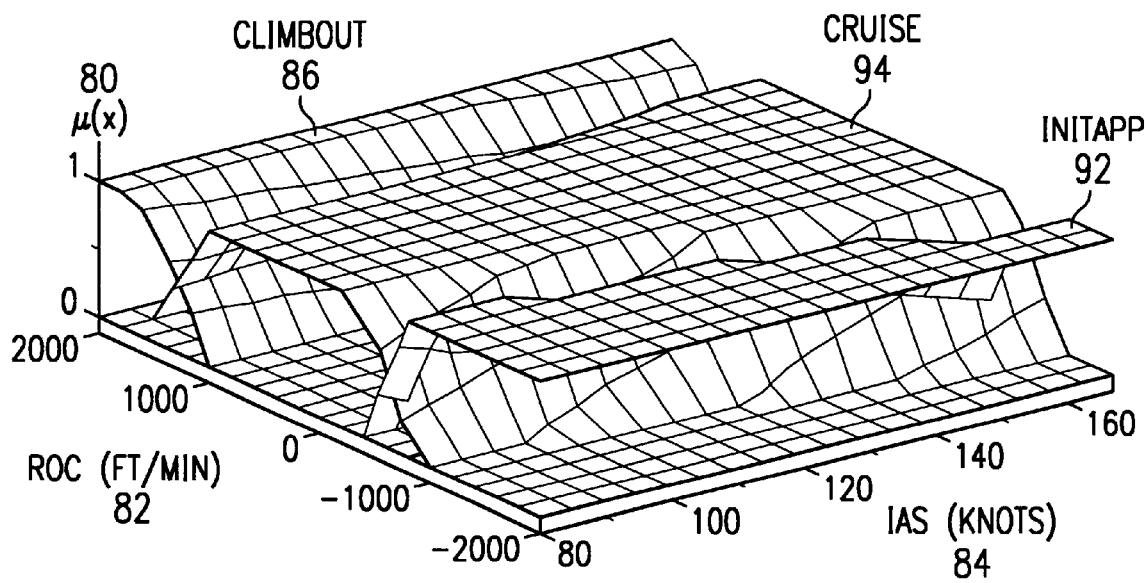

Finally, FIG. 8d illustrates a hypertrapezoidal membership function for an altitude of 4,500 above ground. In this example the dominant mode is cruise 96. The other two modes are climb out 86 and initial approach 94.

Figure 9:
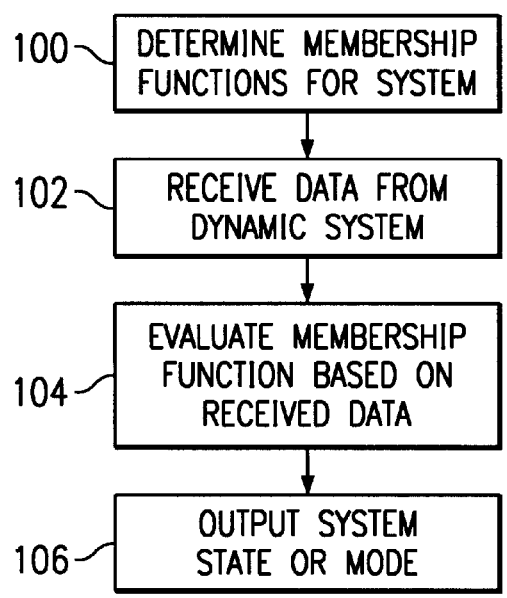

FIG. 9 is a flow chart illustrating the operation of a flight mode interpreter in accordance with the teachings of the present invention. In step 100 hypertrapezoidal membership functions are determined that relate the possible physical parameters with the possible modes the system may operate in. In step 102 sensors or other input devices collect the physical parameters of the system and send the data to a mode interpreter. In step 104 the mode interpreter takes the measured parameters and uses the hypertrapezoidal membership functions to determine the mode the dynamic system is in. In step 106, the determined mode is output for use in another system.

Thus, it is apparent that there has been provided, in accordance with the present invention, a hypertrapezoidal fuzzy dynamic state interpreter that satisfies the advantages set forth above. Although the present invention has been described in detail, it should be understood that various changes, substitutions, and alterations may be readily ascertainable by those skilled in the art and may be made herein without departing from the spirit and scope of the present invention as defined by the following claims. The present invention is suited for use in a wide range of dynamic systems.

What is claimed is:

1. An apparatus for determining a state of a dynamic system comprising:
    a sensor section operable to sample a plurality of different physical parameters of the system to produce a multi-dimensional sample; and a mode interpreter operable to:
  maintain a respective predetermined prototype point for each of a plurality of multi-dimensional fuzzy sets which each correspond to a respective one of a plurality of possible states of the system;
  determine a degree of hypertrapezoidal fuzzy membership of said sample in each of said multi-dimensional fuzzy sets based on a calculation which is a function of said prototype points and said sample; and
  select one of said states as a function of said determined degrees of hypertrapezoidal fuzzy membership.

2. An apparatus according to claim 1, further comprising a system advisor coupled to said mode interpreter and operable to advise a system user based on said state selected by said mode interpreter.

3. An apparatus according to claim 1, wherein the dynamic system is an aircraft.

4. An apparatus according to claim 3, wherein said states include taxi, take off, climb out, cruise, initial approach, final approach and landing.

5. An apparatus according to claim 3, wherein said physical parameters include aircraft power, indicated air speed, altitude, rate of climb, and parameters dealing with distance to fixed points.

6. An apparatus according to claim 3, further comprising a pilot assist system coupled to said mode interpreter and operable to receive said selected state from said mode interpreter and to formulate pilot assist information to assist a pilot in flight operations.

7. An apparatus according to claim 6 further comprising a presentation section coupled to said pilot assist system and operable to display said pilot assist information.

8. An apparatus according to claim 7, wherein said pilot assist system is operable to control a display mode of said presentation section based on said selected state.

9. An apparatus according to claim 1, wherein said mode interpreter is further operable to maintain a predetermined crispness value representative of how much of a space between respective pairs of said prototype points is fuzzy, said calculation being a function of said prototype points, said sample and said crispness value.

10. An apparatus according to claim 9, wherein said calculation includes solution of the following equations for every possible pair $\lambda_i$ and $\lambda_j$ of said prototype points:

$$\rho_{i|j}(\Lambda) = \frac{|\vec{v}_i|^2 - |\vec{v}_j|^2}{|\vec{v}_{ij}|^2}$$

$$\mu_{i|j}(\Lambda) = \begin{cases} 0; & \rho_{i|j}(\Lambda) \geq 1 - \sigma \\ 1; & \rho_{i|j}(\Lambda) \leq \sigma - 1 \\ \dfrac{\vec{v}_{ij} \cdot \vec{v}_j - \dfrac{\sigma}{2}|\vec{v}_{ij}|^2}{(1-\sigma)|\vec{v}_{ij}|^2}; & \text{otherwise} \end{cases}$$

where $\Lambda$ is said sensor output, $\sigma$ is said crispness value, $\vec{v}_i$ is a vector from $\lambda_i$ to $\Lambda$, $\vec{v}_j$ is a vector from $\lambda_j$ to $\Lambda$, and $\vec{v}_{ij}$ is a vector from $\lambda_i$ to $\lambda_j$, said calculation thereafter including solution for each of said prototype points of one of the following equations:

$$\mu_i(\Lambda) = \frac{\prod_{j=1\neq i}^{M} \mu_{i|j}(\Lambda)}{\sum_{k=1}^{M}\left(\prod_{j=1\neq k}^{M} \mu_{i|j}(\Lambda)\right)} \text{ for } i = 1, 2, \ldots M$$

$$\mu_i(\Lambda) = \frac{\min_j(\mu_{i|j}(\Lambda))}{\sum_{k=1}^{M}\left(\min_j(\mu_{i|j}(\Lambda))\right)} \text{ for } i = 1, 2, \ldots M.$$

11. An apparatus according to claim 10, wherein said selected state corresponds to the respective said prototype point having the largest calculated value of $\mu_i(\Lambda)$.

12. An apparatus according to claim 10, wherein said mode interpreter is operable to effect separate filtering of each said calculated value of $\mu_i(\Lambda)$.

13. An apparatus according to claim 1, wherein said mode interpreter is operable to effect separate filtering of each said determined degree of hypertrapezoidal fuzzy membership.

14. An apparatus according to claim 1, wherein said mode interpreter is further operable to determine a confidence value regarding the accuracy of said selected state.

15. An apparatus according to claim 14, wherein said mode interpreter is operable to determine said confidence value as a function of a difference between the largest and the second largest of said determined degrees of hypertrapezoidal fuzzy membership.

16. A method for determining a state of a dynamic system comprising:
  sampling a plurality of different physical parameters of the system to produce a multi-dimensional sample;
  maintaining a respective predetermined prototype point for each of a plurality of multi-dimensional fuzzy sets which each correspond to a respective one of a plurality of possible states of the system;
  determining a degree of hypertrapezoidal fuzzy membership of said sample in each of said multi-dimensional fuzzy sets based on a calculation which is a function of said prototype points and said sample; and
  selecting one of said states as a function of said determined degrees of hypertrapezoidal fuzzy membership.

17. A method according to claim 16, including the steps of:
  maintaining a predetermined crispness value representative of how much of a space between respective pairs of said prototype points is fuzzy; and
  carrying out said calculation of said determining step as a function of said prototype points, said sample and said crispness value.

18. A method according to claim 17, wherein said calculating step includes the step of solving the following equations for every possible pair $\lambda_i$ and $\lambda_j$ of said prototype points:

$$\rho_{i|j}(\Lambda) = \frac{|\vec{v}_i|^2 - |\vec{v}_j|^2}{|\vec{v}_{ij}|^2}$$

-continued $$\mu_{i|j}(\Lambda) = \begin{cases} 0; & \rho_{i|j}(\Lambda) \geq 1-\sigma \\ 1; & \rho_{i|j}(\Lambda) \leq \sigma-1 \\ \dfrac{\vec{v}_{ij} \cdot \vec{v}_j - \dfrac{\sigma}{2}|\vec{v}_{ij}|^2}{(1-\sigma)|\vec{v}_{ij}|^2}; & \text{otherwise} \end{cases}$$

where $\Lambda$ is said sample, $\sigma$ is said crispness value, $\vec{v}_i$ is a vector from $\lambda_i$ to $\Lambda$, $\vec{v}_j$ is a vector from $\lambda_j$ to $\Lambda$, and $\vec{v}_{ij}$ is a vector from $\lambda_i$ to $\lambda_j$, and wherein said calculating step includes the step of solving, for each of said prototype points, one of the following equations:

$$\mu_i(\Lambda) = \frac{\prod_{j=1 \neq i}^{M} \mu_{i|j}(\Lambda)}{\sum_{k=1}^{M}\left(\prod_{j=1 \neq k}^{M} \mu_{i|j}(\Lambda)\right)} \text{ for } i = 1, 2, \ldots M$$

$$\mu_i(\Lambda) = \frac{\min_j(\mu_{i|j}(\Lambda))}{\sum_{k=1}^{M}\left(\min_j(\mu_{i|j}(\Lambda))\right)} \text{ for } i = 1, 2, \ldots M.$$

19. A method according to claim 18, including the step of carrying out said selecting step by selecting one of said states which corresponds to the respective said prototype point having the largest calculated value of $\mu_i(\Lambda)$.

20. A method according to claim 18, including the step of effecting separate filtering of each said calculated value of $\mu_i(\Lambda)$.

21. A method according to claim 16, including the step of effecting separate filtering of each said determined degree of hypertrapezoidal fuzzy membership.

22. A method according to claim 16, including the step of determining a confidence value regarding the accuracy of said selected state.

23. A method according to claim 22, including the step of determining said confidence value as a function of a difference between the largest and the second largest of said determined degrees of hypertrapezoidal fuzzy membership.

\* \* \* \* \*